(12) United States Patent
Kirchner

(10) Patent No.: US 10,805,334 B2
(45) Date of Patent: Oct. 13, 2020

(54) METHOD AND SYSTEM FOR DETECTION AND AVOIDANCE OF WEAKNESSES IN A NETWORK CONNECTED DEVICE

(71) Applicant: SIEMENS AKTIENGESELLSCHAFT, Munich (DE)

(72) Inventor: Michael Kirchner, Munich (DE)

(73) Assignee: SIEMENS AKTIENGESELLSCHAFT (DE)

( * ) Notice: Subject to any disclaimer, the term of this patent is extended or adjusted under 35 U.S.C. 154(b) by 165 days.

(21) Appl. No.: 16/060,089

(22) PCT Filed: Dec. 7, 2016

(86) PCT No.: PCT/EP2016/080012
§ 371 (c)(1),
(2) Date: Jun. 7, 2018

(87) PCT Pub. No.: WO2017/097804
PCT Pub. Date: Jun. 15, 2017

(65) Prior Publication Data
US 2018/0367562 A1    Dec. 20, 2018

(30) Foreign Application Priority Data
Dec. 10, 2015   (DE) .................. 10 2015 224 886

(51) Int. Cl.
*H04L 29/06* (2006.01)
*G06F 21/57* (2013.01)
*H04L 12/24* (2006.01)

(52) U.S. Cl.
CPC ........ *H04L 63/1433* (2013.01); *G06F 21/577* (2013.01); *H04L 41/28* (2013.01);
(Continued)

(58) Field of Classification Search
CPC .............................. H04L 63/1433; H04L 69/18
See application file for complete search history.

(56) References Cited

U.S. PATENT DOCUMENTS

| 5,999,979 A | 12/1999 | Vellanki et al. |
| 2007/0004398 A1* | 1/2007 | Juan ............ H04W 24/00 455/423 |

(Continued)

FOREIGN PATENT DOCUMENTS

| EP | 0956686 A1 | 11/1999 |
| WO | WO 2013102112 A2 | 7/2013 |

OTHER PUBLICATIONS

International Search Report for PCT International Application No. PCT/EP2016/080012 filed Feb. 28, 2017.

(Continued)

*Primary Examiner* — Baotran N To
(74) *Attorney, Agent, or Firm* — Schmeiser, Olsen & Watts LLP

(57) ABSTRACT

A method and a system for identifying a weakness in a first device that is arranged in a first network, including transmission of a first message to a second device, wherein the second device is arranged in a second network outside the first network, including reception and evaluation of the first message by the second device for the purpose of providing a piece of identification information for the first device in the first network, including composition and transmission of a second message to the first device by the piece of identification information by the second device and including display of a weakness by the first device or second device if the second message is received by the first device. The method and a system can be used to check a secure network and/or device configuration in the industrial and private sectors.

8 Claims, 1 Drawing Sheet

(52) U.S. Cl.
CPC ........ *H04L 69/18* (2013.01); *G06F 2221/034* (2013.01); *H04L 63/02* (2013.01)

(56) References Cited

U.S. PATENT DOCUMENTS

2007/0113080 A1    5/2007   Shankar
2013/0174261 A1*  7/2013   Wilkerson ............ H04L 67/125
                                                          726/25

OTHER PUBLICATIONS

Non-English European Exam Report for Application No. 16 815 759.2, dated Jul. 22, 2019.

* cited by examiner

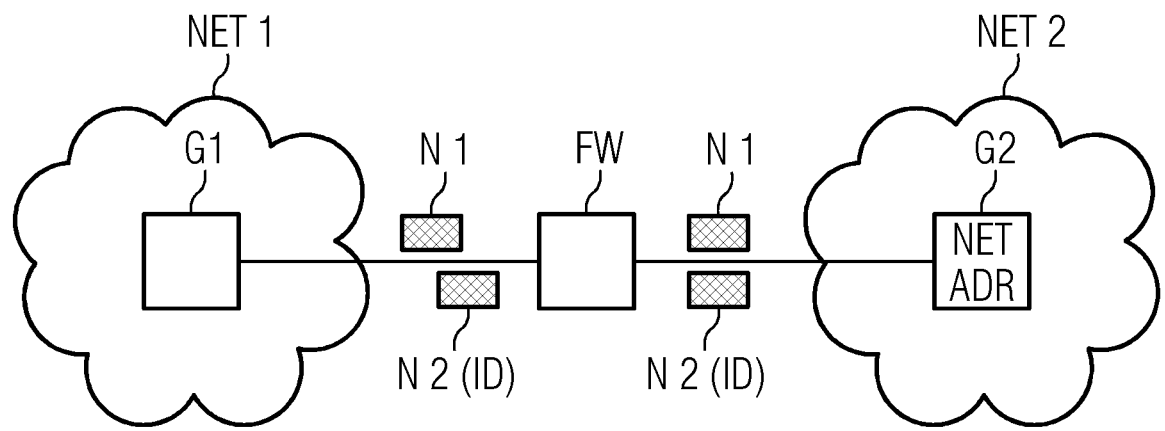

METHOD AND SYSTEM FOR DETECTION AND AVOIDANCE OF WEAKNESSES IN A NETWORK CONNECTED DEVICE

CROSS-REFERENCE TO RELATED APPLICATIONS

This application claims priority to PCT Application No. PCT/EP2016/080012, having a filing date of Dec. 7, 2016, based off of German application No. 102015224886.0 having a filing date of Dec. 10, 2015, the entire contents of both of which are hereby incorporated by reference.

FIELD OF TECHNOLOGY

The following relates to a method and an apparatus for the avoidance of weaknesses.

BACKGROUND

The current push toward digitization is also accompanied by a networking of devices, for example in the industrial environment, such as, for example, in production plants. Thus, in the application scenario of the Industry 4.0 concept, machines are intended to be able to communicate with one another and make decisions autonomously. However, it is evident that devices which are accessible via the Internet can be manipulated by unauthorized parties.

With advancing digitization and networking of devices, the security of these devices against unwanted manipulation must be improved, particularly if these devices are accessible from the Internet.

SUMMARY

As a result, an advantage is to indicate methods and apparatuses which can indicate weaknesses in a networking of a device in a network.

Embodiments of the invention relate to a method for detecting a weakness of a first device which is disposed in a first network, with the following steps:
a) transmission of a first message to a second device, wherein the second device is disposed in a second network outside the first network;
b) reception and evaluation of the first message by the second device for the provision of identification information of the first device in the first network;
c) creation and transmission of a second message to the first device by means of the identification information by the second device;
d) indication of a weakness by the first device or second device if the second message is received by the first device.

By means of the method, it is possible to detect in a simple and reliable manner whether and with which communication protocols the first device has access outside the first network. A check can also be carried out to determine whether, in the event of a successful transmission of the first message, a second message can be successfully delivered to the first device.

A further advantage lies in the fact that the first device to be checked itself instigates the transmission and that messages are thus generated and transmitted initially within the first network only. Only a message that is not blocked, e.g. by a firewall, therefore reaches the outside. In addition, the first device can address a server of the manufacturer of the first device in a targeted manner as the second device, whereby the manufacturer receives specific information relating to the "security" of the first device. As a result, the manufacturer can detect whether a possible weakness exists in a plurality of its products, if e.g. different devices of its product lines are in each case able to deliver a first message successfully to the manufacturer. The manufacturer can furthermore launch "attacks" in a targeted manner in the form of a second message in the direction of the first device since the manufacturer has specific information relating to possible weaknesses of the first device. The security of the first device can be significantly increased through these advantages.

A message, such as the first or second message, is understood in this embodiment of the invention to mean a facility to signal a status from one device to a further device, such as the first device and the second device. The status may be signaled e.g. by means of an email message or by means of any other transmission protocol. It is also comprised by embodiments of the invention that a plurality of transmission protocols are involved in the transmission of the status, wherein a conversion from one transmission protocol to another transmission protocol can take place. The transmission protocol may use further transmission techniques, such as e.g. further transport protocols, in order to transmit the status. An FTP transmission protocol (FTP—File Transfer Protocol, see RFC 959), for example, uses further transport protocols such as TCP (TCP—Transmission Control Protocol, see RFC 793) and IP (IP—Internet Protocol, see RFC 791).

A network address which is allocated to the first message as the sender address is preferably assigned to the identification information. The first device can thereby be identified in a simple manner.

In one preferred development of embodiments of the invention, the first message and/or second message is/are generated and transmitted at least once using at least one transmission protocol from a plurality of protocols. The first device tests a plurality of transmission protocols in order to transmit its first message to the second device. This has the advantage, on the one hand, that the first device knows the transmission protocols which are permissible for the first device and can therefore test these transmission protocols in a time-efficient and resource-efficient manner. On the other hand, a check for possible weaknesses is enabled by the testing of different transmission protocols.

In one development of embodiments of the invention, an activation of a device-specific functionality of the first device is signaled by the second message and the first device reveals its weakness by indicating a device-specific functionality activated by the second message. An identified weakness can thereby be indicated to an operator of the first device in a simple and efficient manner. The indication of the identified weakness can furthermore remain with the operator, so that this weakness can initially remain secret and the operator has time to eliminate the weakness.

Embodiments of the invention furthermore comprise a system for detecting a weakness with
 a first device which is disposed in a first network, and
 a second device which is disposed in a second network outside the first network, wherein the first device and the second device are configured to carry out the following steps:
a) transmission of a first message to a second device by the first device;
b) reception and evaluation of the first message by the second device for the provision of identification information of the first device in the first network;

c) creation and transmission of a second message to the first device by means of the identification information by the second device;

d) indication of a weakness by the first device or second device if the second message is receivable by the first device.

In a further development of embodiments of the invention, a network address which is allocated to the first message as the sender address is assignable to the identification information.

In one advantageous design of embodiments of the invention, the first message and/or second message is/are generated and transmittable at least once using at least one transmission protocol from a plurality of protocols.

In a further development of embodiments of the invention, an activation of a device-specific functionality of the first device is signaled by the second message and the first device reveals its weakness by indicating a device-specific functionality activated by the second message.

The advantages of the first and second device, and also of the system, are similar to those of the method.

BRIEF DESCRIPTION

Some of the embodiments will be described in detail, with reference to the following figures, wherein like designations denote like members, wherein:

FIG. 1 shows two interconnected networks with a first device and a second device.

DETAILED DESCRIPTION

Elements with the same function and mode of operation are denoted with the same reference numbers in the FIGURE.

A first example embodiment is explained in detail with reference to FIG. 1. Robots which weld together chassis parts for vehicles are present in a production plant of an automobile manufacturer. A welding robot of this type is designated in FIG. 1 as a first device G1. The first device or first means generally describes a unit which performs a programmable function and can exchange data via a communication interface with other units. The welding robots G1 are located in an internal network of the automobile manufacturer, designated by the first network NET1.

The first network NET1 is connected via a firewall FW to a second network NET2. The second network is, for example, an Intranet operated by an external provider. A server of the manufacturer of the welding robot, designated as the second device G2, is present in the second network. The second device or second means generally describes a unit which performs a programmable function and can exchange data via a communication interface with one or more other units.

In this example, the first and the second network are interconnected via a communication line which has the firewall. The first and the second network can also be connected "indirectly" via one or more further networks for exchanging data, such as messages. The respective devices can be interconnected directly or via further devices of the respective network within the respective first and second networks. The firewall can generally be formed from one or more units along the communication connection and can be disposed between the first and the second device. A part of the firewall as a unit in the first network can therefore already restrict the data traffic.

Data are exchanged via a respective communication protocol, such as, for example, IP (IP—Internet Protocol, RFC 791). The first and second network are generally operated separately from one another, for example different address spaces are used in both networks, such as, for example, the IP address space 192.168.179.0-192.168.179.255 for the first network and the IP address space 192.168.177.0-192.168.178.255 for the second network. As well as the use of the same communication protocols, the first and the second network can also use different communication protocols, wherein a unit for converting the two different communication protocols is disposed between the first and second network, whereby data can be exchanged between the two networks.

In the present example embodiment, the first device G1 attempts to transmit a first message N1 from the first network to the second device G2 in the second network at a time in order to detect weaknesses. The first device tests the transmission of the first message via one or more transmission protocols, such as, for example, FTP (FTP—File Transfer Protocol, see RFC 959) or HTTP (HTTP—Hypertext Transfer Protocol, see RFC 2616) in order to ascertain which of possible transmission protocols is not blocked by the firewall and the first message is therefore receivable by the second device. Thus, according to embodiments of the invention, a transmission protocol is understood to mean any type of protocol by means of which the first device can exchange data, such as messages, with the second device.

Specific communication ports are often assigned to specific transmission protocols, such FTP, so that receiving devices can automatically identify the associated transmission protocol on the basis of incoming messages on a specific port. The FTP protocol is thus normally signaled on a port pair 20 and 21.

After one of the previously tested transmission protocols has been detected which permits the first message via the firewall from the first into the second device, this first message can be received by the second device. The second device analyses the received first message for identification information II of the first device, in particular for the sender network address NETADR of the first device, e.g. 192.168.179.22. The second device then sends a second message N2 to this sender network address NETADR of the first message. If the second message is received by the first device, a weakness exists, since the first device is directly accessible from the Internet. The second device must possibly also test different transmission protocols on possibly different ports, so that the second message can be transmitted to the first device.

In a further optional step, the second device sends an identifier ID along with the second message, signaling an activation of a device-specific functionality of the first device. A device-specific functionality of this type may, for example, be a readout of specific status information, but also a setting of critical parameters such as, for example, a modification of security mechanisms within the first device or a continuous transfer of control parameters, allowing conclusions to be drawn with regard to specific manufacturing strategies of the welding robot.

It appears appropriate to implement a method represented in the above example in such a way that the first device attempts as the second device to contact a test server of the device manufacturer. The device manufacturer knows hidden functions which it can test using the second message in order to find weaknesses in a deficient isolation of the first device outside the first network. A manufacturer of the first device can then inform the operator of the first device about weaknesses, such as the accessibility of the first device from the Internet. It can furthermore also activate device-specific information in the first device, such as, for example, a notification to the administrator of the first device that the first device can be influenced, e.g. manipulated, from outside in an unwanted manner.

Thus, in this example embodiment, the automobile manufacturer and/or the device manufacturer is/are notified in order to be able to undertake countermeasures promptly when weaknesses, such as, for example, the determination of a device address of the first device and/or a manipulation facility of device-specific functionalities, are detected. On the one hand, countermeasures may consist in improving an isolation of the first device or the first network from the outside world by blocking specific ports or internal IP addresses, and also calling facilities within the first device, such as, for example, setting of passwords for calling specific functionalities or setting device parameters.

A manufacturer of devices, such as, for example, the first device, often provides information indicating how said device is to be implemented within a manufacturing network in order to minimize attacks and therefore damage in manufacturing. However, this often requires complex installations and time-consuming maintenance, such as, for example, the loading of security updates. Through continuous tests determining whether the first device can send the first message outside and can be accessed or manipulated from outside, a weakness can be detected in a simple and low-cost manner in order to be able to undertake countermeasures promptly once the weakness has been identified.

According to embodiments of the invention, the first message and the second message are to be understood not only as transmission-protocol-specific messages. Instead, every type of information transmission which comprises an exchange of information, such as an accessibility of the first device by a second device, is to be understood under the term message. The type of information can be defined by the transmission protocol that is used. Furthermore, the term identification information, such as e.g. network address, is also not restricted to an IP address (IP—Internet Protocol) alone, but instead every addressing type of the first device with which the first device can receive the message is also included within the meaning of the term identification information. The identification information can thus be configured, for example, in the form of a device-specific MAC address (MAC—Media Access Control Address) or in the form of group addressing allocated to a multiplicity of first devices, such as e.g. a broadcast address. The identification information can also be designed in the form of a plurality of data fields, such as, for example, from the IP address of a device outwardly isolating the network, also referred to as an edge router (=network router) or gateway, and a port address which identifies the first device in the first network. This last example represents the network address, i.e. the identification information II, of the first device with the use of an NAT technology (NAT—Network Address Translation, see RFC 3102, 2103, 2104).

Embodiments of the invention also relate to a system SYS comprising the first and the second device. The respective device can implement and carry out the individual steps in hardware, software or in a combination of hardware and software. The respective device may thus have a processor which reads out and processes one or more steps of embodiments of the invention as machine code from a memory connected to the processor via a bus. The processor can furthermore exchange data, such as messages, with other devices via an input and/or output interface connected to the bus. At least the first or the second device may furthermore have a notification element by means of which the weakness can be indicated. The notification element can be implemented and executed as an optical signal, acoustic signal, as a representation on a display screen or as output in a data structure or file structure of the memory. The notification element can be activated by the respective processor via a bus.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for detecting a weakness of a first device which is disposed in a first network, the method comprising:
   a) transmitting, by the first device, a first message to a second device, wherein the second device is disposed in a second network outside the first network, wherein the first device tests a plurality of transmission protocols and transmits the first message using at least one transmission protocol from the tested plurality of transmission protocols, and wherein the transmitting of the first message using the at least one transmission protocol from the test plurality of transmission protocols indicates a possible weakness of the first device;
   b) receiving and evaluating the first message by the second device for the provision of identification information of the first device in the first network;
   c) creating and transmitting a second message to the first device by means of the identification information by the second device; and
   d) indicating a weakness by the first device or second device if the second message is received by the first device.

2. The method as claimed in claim 1, wherein a network address which is allocated to the first message as the sender address is assigned to the identification information.

3. The method as claimed in claim 1, wherein the second message is generated and transmitted using the at least one transmission protocol from the plurality of transmission protocols.

4. The method as claimed in claim 1, wherein an activation of a device-specific functionality of the first device is signaled by the second message, and the first device reveals its weakness by indicating a device-specific functionality activated by the second message.

5. A system for detecting a weakness with a first device which is disposed in a first network, and a second device which is disposed in a second network outside the first network, wherein the first device and the second device are configured to:
   a) transmit a first message to the second device by the first device, wherein the first device tests a plurality of transmission protocols and transmits the first message using at least one transmission protocol from the tested plurality of transmission protocols, and wherein the transmitting of the first message using the at least one transmission protocol from the test plurality of transmission protocols indicates a possible weakness of the first device;

b) receive and evaluate the first message by the second device for the provision of identification information of the first device in the first network;

c) create and transmit a second message to the first device by means of the identification information by the second device; and d) indicate a weakness by the first device or second device if the second message is receivable by the first device.

6. The system as claimed in claim 5, wherein a network address which is allocated to the first message as the sender address is assignable to the identification information.

7. The system as claimed in claim 5, wherein the second message can be generated and transmitted using the at least one transmission protocol from the plurality of transmission protocols.

8. The system as claimed in claim 5, wherein an activation of a device-specific functionality of the first device can be signaled by the second message, and the first device reveals its weakness by indicating a device-specific functionality activated by the second message.

* * * * *